(12) United States Patent
Ebelhar

(10) Patent No.: US 7,975,461 B2
(45) Date of Patent: Jul. 12, 2011

(54) TOBACCO CUTTING MACHINE

(76) Inventor: Joseph Ebelhar, Davie Town, Broward County, FL (US)

( * ) Notice: Subject to any disclaimer, the term of this patent is extended or adjusted under 35 U.S.C. 154(b) by 74 days.

(21) Appl. No.: 12/319,487

(22) Filed: Jan. 8, 2009

(65) Prior Publication Data

US 2009/0178380 A1    Jul. 16, 2009

Related U.S. Application Data

(60) Provisional application No. 61/011,150, filed on Jan. 15, 2008.

(51) Int. Cl.
*A01D 45/16* (2006.01)
(52) U.S. Cl. .............................. 56/27.5; 56/17.1; 56/214
(58) Field of Classification Search ............... 56/6, 13.6, 56/13.7, 14.2, 14.3, 17.1, 17.3, 17.5, 27.5, 56/208, 210, 214, 244, 503, DIG. 16
See application file for complete search history.

(56) References Cited

U.S. PATENT DOCUMENTS

| | | | | |
|---|---|---|---|---|
| 2,578,963 A | * | 12/1951 | Bell | 56/13.6 |
| 2,933,875 A | * | 4/1960 | Meyer et al. | 56/27.5 |
| 2,977,741 A | * | 4/1961 | Stroman | 56/13.6 |
| 3,017,732 A | * | 1/1962 | Keyes | 56/11.9 |
| 3,249,366 A | * | 5/1966 | Meyer | 280/771 |
| 3,507,103 A | * | 4/1970 | Harrington et al. | 56/27.5 |
| 3,662,526 A | * | 5/1972 | Smith | 56/63 |
| 3,683,603 A | * | 8/1972 | Smith | 56/63 |
| 3,992,860 A | * | 11/1976 | Bobbitt, Jr. | 56/27.5 |
| 4,237,681 A | * | 12/1980 | Zantzinger, Jr. | 56/27.5 |
| 4,354,340 A | * | 10/1982 | Huggins et al. | 56/27.5 |
| 4,384,444 A | * | 5/1983 | Rossler, Jr. | 56/13.6 |

\* cited by examiner

*Primary Examiner* — Thomas B Will
*Assistant Examiner* — Mai Nguyen
(74) *Attorney, Agent, or Firm* — Gary K. Price

(57) ABSTRACT

A harvesting apparatus for row crops that includes a self-propelled carrier unit and a harvesting device. The carrier unit is a motor-driven vehicle. The harvesting device consists of an upper frame in sliding engagement with a pair of vertical members coupled to a cutting platform, lifting means for raising and lowering the cutting platform, and means for positioning the cutting platform along the length of the upper frame. The cutting platform includes a base having opposing ends, each end having a pair of base guides that define a longitudinal passage, a cutter blade assembly having a blade with a cutting edge, which cutting edge is in communication with the longitudinal passage such that when the blade is in use, and when a tobacco plant passes along the longitudinal passage the blade will cut the plant by a slicing operation. The frame further includes front and rear wheel assemblies, and a shield that is attached to each of the vertical members.

13 Claims, 4 Drawing Sheets

US 7,975,461 B2

TOBACCO CUTTING MACHINE

CROSS REFERENCES TO RELATED APPLICATIONS

U.S. Provisional Patent Application No. 61/011,150, filed Jan. 15, 2008, with title "Tobacco Cutting Machine" which is hereby incorporated by reference. Applicant claim priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable.

BACKGROUND OF THE INVENTION

1. Field of the Invention

This invention relates generally to a harvesting apparatus for row crops and, more particularly, to an apparatus for cutting tobacco plants.

2. Brief Description of Prior Art

The harvesting of tobacco has always been a costly and time-consuming operation. Tobacco leaves must be handled very carefully to prevent bruising or damaging the leaves in harvesting. Damaged or bruised leaves do not produce high quality tobacco when cured and to the present Inventor's knowledge, no harvesting machinery has yet been developed which is capable of efficiently cutting the plant without causing damage to a substantial proportion of the crop that is harvested. For these reasons, substantially all of the tobacco which is harvested throughout the world is harvested manually, with the result that the labor costs involved in harvesting the product are very substantial. In addition, this type of manual labor is extremely unpleasant and an adequate labor force to perform this type of operation is not readily available.

As will be seen from the subsequent description, the preferred embodiments of the present invention overcome disadvantages of the prior art.

SUMMARY OF THE INVENTION

The present invention overcomes the difficulties of the prior art described above by providing a machine that effectively and efficiently cuts the tobacco plant with minimal damage or bruising to the crop. The tobacco cutting machine of the present invention generally includes a self-propelled carrier unit and a harvesting device. The self-propelled carrier unit is a known motor-driven vehicle generally used for pulling farm machinery, such as a tractor, that has been modified for attachment to the harvesting device. The harvesting device consists of an upper frame in sliding engagement with a pair of vertical members each coupled to a cutting platform. The cutting machine includes lifting means for raising and lowering the cutting platform, as well as means for positioning the vertical members thereby the cutting platforms along the length of the upper frame.

Each vertical member downwardly extends from the upper section of the frame and attach to the cutting platform. The cutting platform includes a base having opposing ends with the vertical member disposed between the opposing ends at the approximate midway of the base. The opposing ends each include a pair of base guides which are arranged in spaced parallel relationship with respect to one another to define a longitudinal passage therebetween. The width of the passage is such that it will receive one row of tobacco plants during harvesting without damaging the plants in adjacent rows. The opposing ends each further include a cutter blade assembly having a blade with a cutting edge, which cutting edge is in communication with the longitudinal passage such that when the blade is in use, and when a tobacco plant passes along the longitudinal passage the blade will cut the plant by a slicing operation. A motor assembly is affixed to the upper surface of the base in order to activate operation of the cutter blade assembly.

The frame further includes front and rear wheel assemblies, and a shield that is attached to each of the vertical members. The shield is positioned such that clippings from the cutting operation as described are controlled from plugging, jamming and/or damaging the elements of the base.

DESCRIPTION OF THE PREFERRED EMBODIMENT

Figure 1:
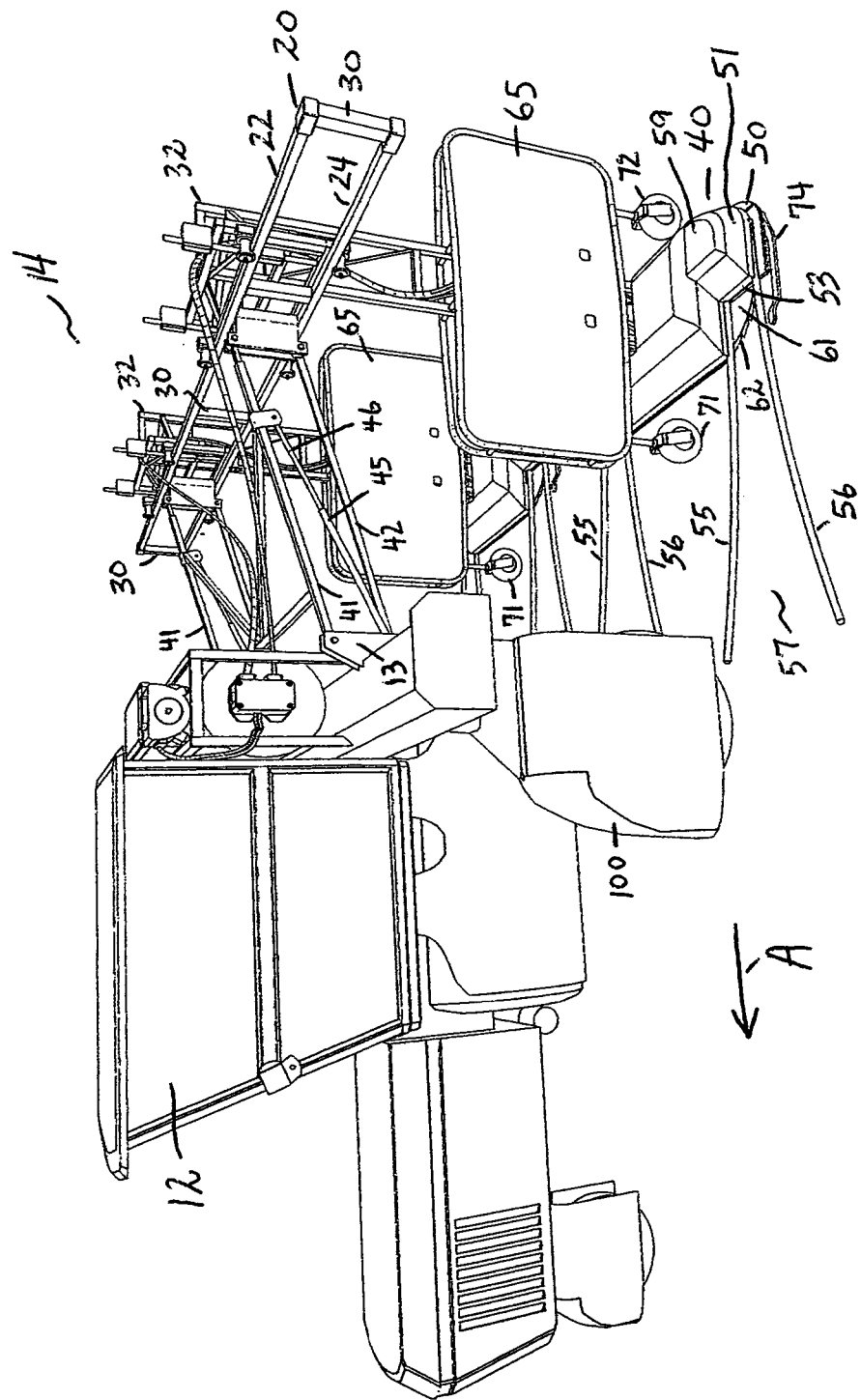
FIG. 1 is a perspective view of a preferred embodiment of the present invention, a tobacco cutting machine.

The tobacco cutting machine of the present invention is primarily directed to a harvesting apparatus for row crops. The cutting machine provides a machine that effectively and efficiently cuts the plant with minimal damage or bruising to the crop. Specifically, it will be noted in the drawings that the cutting machine of the present invention provides an automated yet relatively simple means of harvesting row crops. In the broadest context, the tobacco cutting machine of the present invention consists of components configured and correlated with respect to each other so as to attain the desired objective.

With reference to the drawings, reference numeral 10 refers generally to a self-propelled harvesting machine according to the preferred embodiment of the present invention. The machine includes a self-propelled carrier unit 12 and a harvesting device 14.

The self-propelled carrier unit 12 is a known motor-driven vehicle generally used for pulling farm machinery, such as a tractor, that has been modified for attachment to the harvesting device 14 as will be described.

The harvesting device 14 consists of a frame 20 coupled to a cutting platform 40. The frame 20 includes an upper section defined by upper and lower bar members 22, 24 respectively, that are arranged in spaced parallel relationship with respect to one another. The upper and lower members 22, 24 are connected by a plurality of cross members 30.

A pair of vertical members 32 are in sliding engagement with the frame 20 and extend from the frame to the cutting platform 40. It should be noted that the frame 20 having the upper and lower members 22, 24, the cross members 30, and the vertical members 32, along with the cutting platform 40 generally define the embodiments of the unique harvesting device 14 of the present invention.

Figure 2:
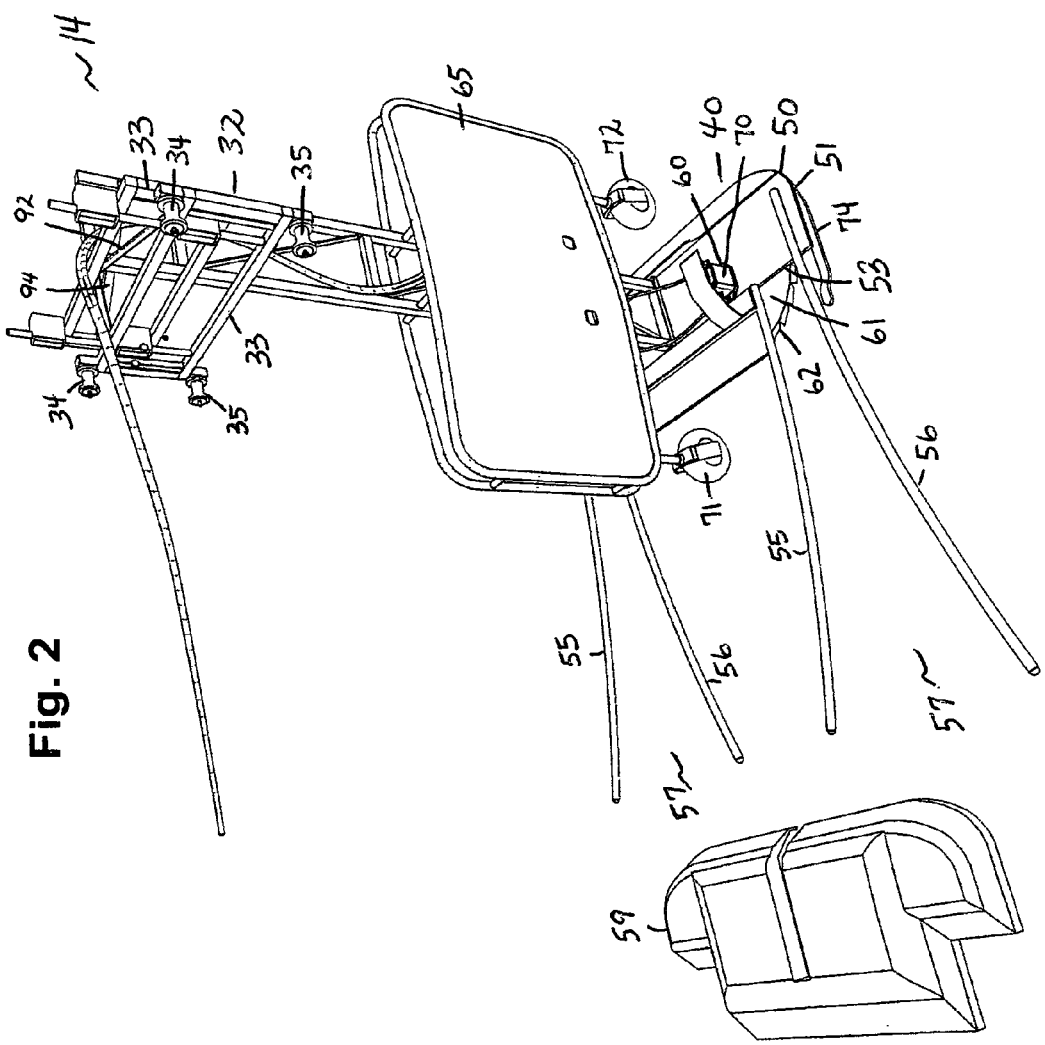
FIG. 2 is a perspective view of the harvesting device of the cutting machine of FIG. 1.
Figure 3:
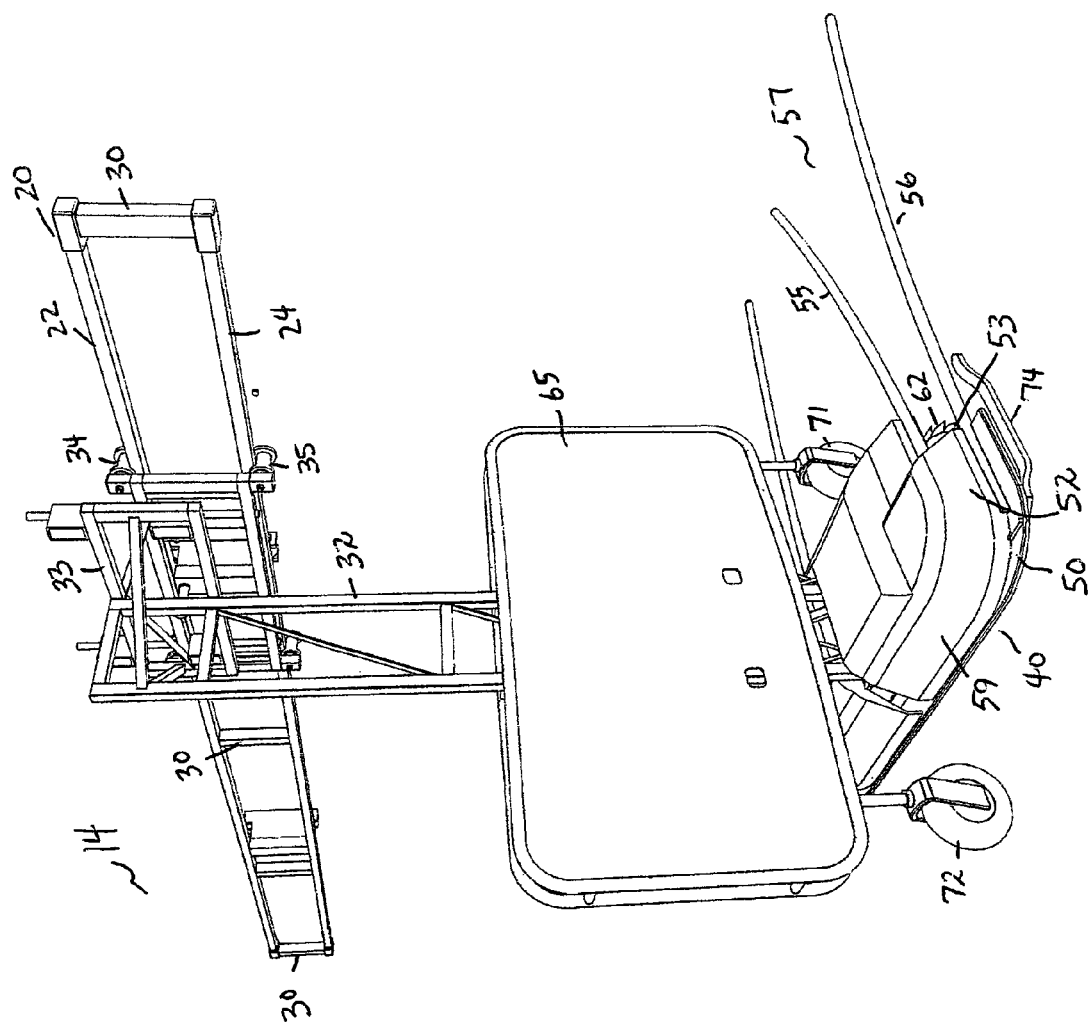
FIG. 3 is a side view of the harvesting device illustrated in FIG. 2.
Figure 4:
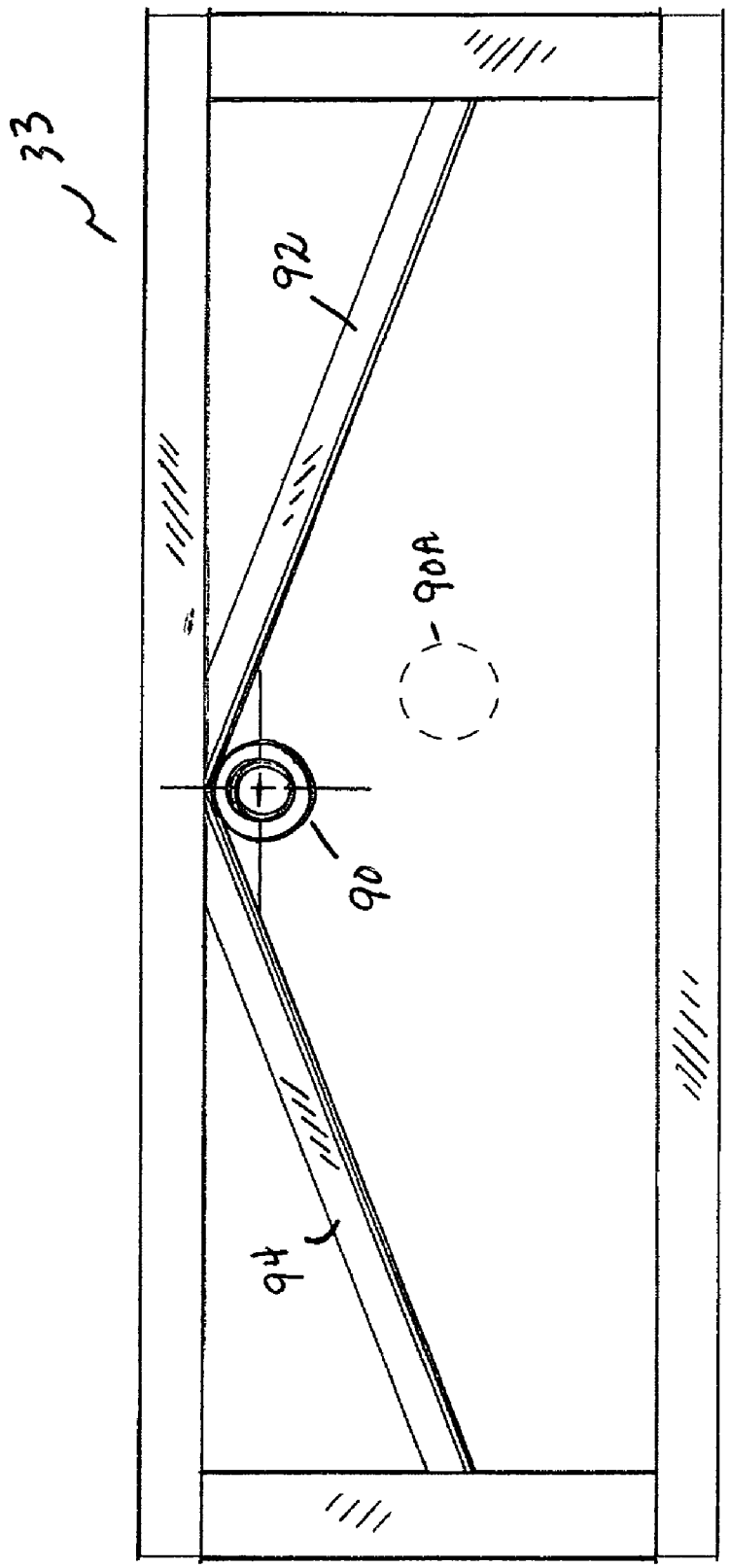
FIG. 4 shows further details of the harvesting device.

As best shown in FIGS. 2, 3 and 4, the vertical member 32 includes bracket 33 including upper and lower bearings 34, 35, and angle brackets 92, 94. Wherein the upper bearing 34 is in sliding engagement with the frame's upper bar member 22 and the lower bearing 35 is in sliding engagement with the frame's lower bar member 24. As will be understood, selectively adjusting the vertical members 32 along the length of the bar members 22, 24 effectively positions the cutting platform 40.

Interface between the Self-Propelled Carrier Unit and Harvesting Device

Referring to FIG. 1, a pair of support plates 13 are attached to the carrier unit 12 and disposed between the carrier unit 12 and harvesting device 14, the plates 13 provided to support the functional elements of the harvesting device 14. In particular, each support plate 13 includes upper and lower support arms 41, 42 that extend in parallel from the support plate 13 to the frame 20 such that the upper support arm 41 is coupled to the frame's upper bar member 22 and the lower support arm 42 is coupled to the frame's lower bar member 24. A lift means such as a tractor's hydraulic system or a hydraulic cylinder 45 includes a ram 46 that is pivotally connected to the support plate 13. The user can extend the hydraulic cylinder 45 to selectively raise the frame 20 thereby raising the cutting platform 40 or, retract the hydraulic cylinder 45 to selectively lower the frame 20 thereby lowering the cutting platform 40. The attachment of the hydraulic cylinder 45 from the support plate 13 to the upper support arm 41 is of a conventional manner known in the art.

As should be appreciated from the description herein as well as from the drawings, the interface between the carrier unit 12 and harvesting device 14 is symmetrically constructed with the pair of support plates 13, support arms 41, 42, and hydraulic cylinders 45. As such, only the elements found on one side of the harvesting machine 10 is primarily discussed and shown in FIG. 1. It should be understood that the other set of elements are identical to those described, with the exception that the other set of elements are mirror images of the first set of elements described.

Description of the Cutting Platform

As stated the vertical members 32 downwardly extend from the upper section of the frame 20 and attach to the cutting platform 40. Referring to FIG. 2, the cutting platform 40 includes a base 50 attached to each of the pair of vertical members 32. Each base 50 includes opposing ends 51, 52. The vertical member 32 is disposed between the opposing ends 51, 52 at the approximate midway of the base 50.

As described each vertical member 32 is attached to the base 50. The base 50 includes opposing ends 51, 52. As will be appreciated from the description herein as well as from the drawings, the base 50 is symmetrically constructed with the opposing ends 51, 52. As such, only the elements found on one of the opposing ends of the base 50 is primarily discussed and shown. It should be understood that the elements of the other base ends are identical to those described, with the exception that the other set of elements are mirror images of the first set of elements described.

The base ends 51, 52 of the base 50 include a pair of base guides 55, 56 which are arranged in spaced parallel relationship with respect to one another to define a longitudinal passage 57 therebetween. The guides 55, 56 may be positioned further apart or closer to one another depending upon the width of the rows of the tobacco being harvested. Adjustment of the guides 55, 56 can be achieved by means known in the art. The overall width of the passage 57 is such that it will receive one row of tobacco plants during harvesting without damaging the plants in adjacent rows.

As illustrated the longitudinal passage 57 projects inward adjacent an edge 53 of the base 50. The ends 51, 52 further include a cutter blade assembly 60 (shown in FIG. 2). The cutter blade assembly 60 includes a blade 61 having a cutting edge 62, which cutting edge 62 is in communication with the longitudinal passage 57 such that when the blade 61 is in use, and when a tobacco plant passes along the longitudinal passage 57 the blade 61 will cut the plant by a slicing operation. Skid bracket 74 prevents the blade 61 from digging into the ground surface.

As illustrated in the drawings, the blade 61 is pivotally mounted to the base 50 and extends into the passage 57 substantially parallel with the base 50 and is mounted adjacent the edge 53 of the base 50 to which it is secured.

The base 50 further includes a casing 59 to an enclosure within which to protect the upper surface of the base and further defines a partial protection or cover of the blade 61 as best shown in FIG. 1.

FIG. 2 shows the casing 59 removed and a motor assembly 70 such as a hydraulic motor powered by hydraulic fluid from the tractor 12, is affixed to the upper surface of the base 50 in order to activate operation of the cutter blade assembly 60. The attachment and operation of the motor assembly 70 is of a conventional manner known in the art.

As illustrated the frame 20 further includes front and rear wheel assemblies 71, 72 that further support the harvesting device 14 during application. The front and rear wheels 71, 72 serve to keep the vertical member 32 aligned once its position is set along frame 20.

When the harvesting machine according to the present invention is to be used, the height of the cutter blade above the ground is determined. The adjustment in height can be achieved as previously described by raising or lowering the frame by means of the hydraulic cylinder 45. Likewise the longitudinal passage 57 can be aligned with the row of crops to harvest by selectively positioning the vertical member 32 along the length of the bar members 22, 24 thereby positioning the guides 55, 56 of the cutting platform 40 as previously described.

When the correct height is selected and the longitudinal passage 57 positioned, the motor assembly 70 is placed in operation to start the cutter blade assembly 60. The harvester is then driven forward as indicated by arrow "A" in FIG. 1 so that the first tobacco plants in the row enters the longitudinal passage 57. It will be noted in the drawings that there is substantial space between the base guides 55, 56 where the plant enters the passage 57. As the machine continues to move forward, the blade 61 approaches the tobacco plant. If a stem is located in the path of the cutting edge 62 of the blade 61, the forward movement of the blade 61 will cause the cutting edge 62 to engage and cut through the stem of the plant. Again, any stem which lies in the path of travel of the blade 61 will be cut by the cutting edge 61. Cut plants tend to fall over the cutting platform 40 and will wind row for later collection.

The harvesting device 14 further includes a shield 65 attached to each of the vertical members 32. The shield 65 is positioned such that clippings from the cutting operation as described are controlled from plugging, jamming and/or damaging the elements of the base 50. When harvesting is complete, the arms 41, 42 can be used to raise up the cutting platform so that the tractor 12 can be driven at higher speeds. Referring to FIGS. 3 and 4, the frame 20 further includes center roller pins 90, each center roller pin disposed in relation to the vertical member 32 such that the center roller pin 90 cooperates with the angle brackets 92 and 94 to automatically center the vertical member 32 when the frame 20 is lifted by arms 41, 42.

Plant Guide

As can be seen in FIG. 1, as the tractor 12 moves forward "A", plants in rows are guided starting with the shield 100 over the tractor tire. Plants are then guided by the elongated arm guides 55, 56 which define a plant passage 57 leading to the cutter 61. As plants are cut, covers 65 and 59 further guide plants into cut rows. The elements 100, 55, 56, 65 and 59 define a shielded plant passage that protects the plants from bruising during the harvest operation. Each cutter 61 has a similar guide arrangement.

While the best mode for carrying out the invention has been described, those familiar with the art to which this invention relates will recognize various alternative designs and embodiments for practicing the invention. Thus, the above-described preferred embodiment is intended to be illustrative of the invention which may be modified within the scope of the appended claims.

I claim:

1. A tobacco cutter machine comprising:
a self-propelled carrier unit and a harvesting device, said harvesting device including an upper frame in sliding engagement with a pair of vertical members, each of said pair of vertical members coupled to a cutting platform,
lifting means for raising and lowering the cutting platform,
upper bearings for positioning the cutting platform along the length of the upper frame, means for centering the vertical members when the frame is lifted,
wherein said vertical members downwardly extend from said upper frame and attach to said cutting platform,
wherein each vertical member includes a base and said cutting platform includes a base attached to each of the pair of vertical members, wherein each base includes opposing ends with the vertical member disposed between the opposing ends at the approximate midway of the base, said opposing ends each including a pair of base guides that define a longitudinal passage therebetween, a cutter blade assembly having a blade with a cutting edge, which cutting edge is in communication with the longitudinal passage,
a motor assembly affixed to the upper surface of the base in order to activate operation of the cutter blade assembly,
front and rear wheel assemblies, and said front wheel assembly mounted on said vertical member in front of said cutter and said rear wheel assembly mounted on said vertical member behind said cutter to guide said vertical member relative to said upper frame during movement of said machine,
a shield attached to each of the vertical members.

2. The cutting machine as recited in claim 1, wherein said self-propelled carrier unit is a tractor.

3. The cutting machine as recited in claim 1, wherein said base guides are mounted to said base to guide plants toward said passage as said self propelled carrier unit travels in a forward direction such that cut plants form into rows.

4. A tobacco cutting machine comprising:
an upper frame, said upper frame including a center roller pin, said roller pin disposed in relation to a vertical member,
a said vertical member mounted to said frame for movement along said frame, wherein said vertical member includes a bracket including upper and lower bearings and angle brackets, said upper and lower bearings in sliding engagement with said frame,
said vertical member coupled to a cutter platform,
lifting means for raising and lowering the frame,
wherein the cutter platform includes a base attached to said vertical member,
wherein said base includes opposite ends each end including a cutter assembly having a blade, and
guides defining a passage leading to said blade wherein in use alignment of said vertical member relative to the upper frame is controlled by at least one wheel assembly on said vertical member adjacent said cutter platform,
wherein said center roller pin cooperates with said angle brackets to center the vertical member when the frame is lifted.

5. The tobacco cutting machine as recited in claim 4, wherein said passage starts adjacent a pulling vehicle and extends past the blade.

6. The tobacco cutting machine as recited in claim 4, wherein said cutter assembly includes a hydraulic motor powered by hydraulic fluid from said tractor.

7. The tobacco cutting machine as recited claim 4, including front and rear wheel assemblies on said vertical member, and a shield attached to the vertical member.

8. The tobacco cutting machine as recited in claim 4, wherein said vertical member is mounted on said frame with bearings such that said vertical members can slide along a length of the frame, wherein the frame length is perpendicular to a forward direction of travel of the tobacco cutting machine.

9. A tobacco cutter machine comprising:
an upper frame,
at least one vertical member mounted to said frame for movement along said frame, said vertical member coupled to a cutter platform,
lifting means for raising and lowering the frame,
centering means for centering the at least one vertical member when the frame is lifted,
wherein the cutter platform is attached to said vertical member, wherein said cutter platform includes opposite ends each end including a cutter assembly having a blade, and
guides defining a passage leading to said blade wherein in use alignment of said vertical member relative to the upper frame is controlled by at least one wheel assembly on said vertical member adjacent said cutter platform.

10. The tobacco cutter machine as recited in claim 9, wherein said passage starts adjacent a pulling tractor and extends behind the blade to define a passage to cut plants.

11. The cutting machine as recited in claim 10, including front and rear wheel assemblies on said vertical member, and a shield attached to the vertical member.

12. The cutting machine as recited in claim 11, wherein said vertical member is mounted on said frame with bearings such that said vertical member can slide along a length of the frame, wherein the frame length is perpendicular to a forward direction of travel of said tractor.

13. The tobacco cutter machine as recited in claim 12, wherein said cutter assembly includes a hydraulic motor powered by hydraulic fluid from said tractor.

* * * * *